3,017,242
REMOVAL OF CESIUM BY SORPTION FROM AQUEOUS SOLUTIONS

Lloyd L. Ames, Richland, Wash., assignor to the United States of America as represented by the United States Atomic Energy Commission
No Drawing. Filed Sept. 9, 1959, Ser. No. 839,038
7 Claims. (Cl. 23—25)

This invention deals with the removal of cesium values from aqueous solutions and in particular from solutions that contain the cesium, including radioactive isotopes such as $Cs^{137}$, in micro- or tracer concentrations together with other cations present in macroconcentrations.

In the processing of neutron-irradiated fuel from neutronic reactors, aqueous waste solutions are obtained which contain the bulk of the fission products; these solutions usually have very high contents of other salts, for instance, when they are derived from extraction processes where salting-out agents had to be added for better operation. Such salts most frequently are calcium, aluminum and strontium nitrates or chlorides.

Cesium 137 is one of the predominant and most dangerous fission products, because it has a half-life of 30 years which means its radiation is strong enough to be hazardous but too slow to reach complete decomposition by decay within a reasonable period of time.

Cesium 137 has a great number of utilities on account of its beta radiation, such as for the sterilization of food, for polymerization of hydrocarbons, for atomic batteries, and it is used in teletherapy and in radiography; for these purposes it is desirable to recover the cesium. Another instance where the removal of cesium might become vital, is in the purification of drinking water that has been contaminated by debris of atomic bombs.

A great number of precipitation methods, mostly based on the formation of complex ferro- or ferricyanides, have been devised for the separation and/or recovery of cesium from aqueous solutions.

Attempts have also been made to remove the cesium by adsorption on cation exchange resins and on clays from the solutions which usually contain it in micro- or tracer concentrations together with other salts in macroconcentrations. Furthermore a great number of zeolites have been tested for their suitability. All these materials, however, proved to lack selectivity, which means the cations present in macroconcentrations were preferentially adsorbed while the small quantity of cesium remained in the solution with the non-adsorbed salts; consequently there actually was no separation. Among the zeolites tested and found unsatisfactory were Linde "A" zeolites in the sodium, potassium and calcium form, mesolite, datolite, pectolite, stilbite, chabazite, brewsterite, laumontite, apophyllite, thomsonite, gonnardite and analcite.

It is an object of this invention to provide a process for removing cesium values from aqueous solutions by means of a sorbent that has selective affinity to cesium in the presence of comparatively larger quantities of other cations.

It is another object of this invention to provide a process for removing cesium values from aqueous solutions with sorbents that are radiation-stable.

It is still another object of this invention to provide a process for the removal of cesium values from aqueous solutions which lends itself well to operation by remote control.

It is furthermore an object of this invention to provide a process for the removal of cesium values from aqueous solutions which can be carried out underground so that no shielding is necessary.

It is still another object of this invention to provide a process for the removal of cesium values from aqueous solutions in which the pH value may vary within a wide range.

It is finally also an object of this invention to provide a process for the removal of cesium values from aqueous solutions which can be carried out at room temperature; this again entails the advantage that no radioactive gases or vapors are developed so that shielding can be restricted to a minimum.

Very unexpectedly it was found that one of the many zeolite materials investigated shows selectivity as to cesium removal from aqueous solutions. This zeolite is clinoptilolite, a sodium-aluminum silicate of the probable formula $Na_2O.Al_2O_3.8SiO_2.6H_2O$; it occurs in nature. The inventor does not know whether this preferential affinity for cesium is based on adsorption, ion exchange or a combination of the two. The phenomenon will be referred to hereinafter broadly as sorption.

The process of this invention thus comprises contacting the aqueous solution containing the cesium values to be removed with clinoptilolite, whereby cesium is sorbed thereon while any other cations present preferentially remain in solution, and then separating the clinoptilolite from the solution. If the cesium then is to be recovered, it is eluted from the sorbent, for instance with an aqueous solution of ammonia, potassium hydroxide or rubidium hydroxide. If, however, the cesium was merely removed from the solution for the purpose of decontaminating it, the clinoptilolite is then fused to decrease its bulk prior to disposal underground or at the bottom of ocean water.

The clinoptilolite can be used either in the sodium form or in the hydrogen form. It is preferably ground prior to use. The particle size may vary widely, but grains of from 0.25 to 1 mm. diameter have been found especially well suitable.

The adsorptive capacity of the clinoptilolite compares favorably with that of cation exchange resins. This is shown in Example I.

EXAMPLE I

One hundred grams of clinoptilolite were found to adsorb 166 milliequivalents (meq.) of cesium from an aqueous solution containing cesium chloride only in a concentration of 0.01 N and having a pH value of 7, while 100 grams of Dowex-50 adsorbed 224 meq. of cesium under the same conditions. On the other hand, when a feed solution was used that was 1 N in sodium nitrate, 0.01 N in cesium chloride and also contained tracer concentrations of $Cs^{137}$, 100 grams of clinoptilolite adsorbed 75 meq. of cesium, Dowex-50 negligibly small amounts only and Amberlite IRC-50 less than 1 meq. per 100 grams. (Dowex-50 and Amberlite IRC-50 are cation exchange resins.) This clearly shows the superiority of the clinoptilolite over other adsorbents or ion exchange materials. Similar drastic comparisons were obtained with all the other materials tested and listed above.

The concentrations of the solutions to be treated may vary widely, and the process is operative equally well for solutions that contain cesium in tracer, in micro- or in macroconcentrations.

The effect of flow rate, temperature and pH value on the adsorptive capacity of the clinoptilolite is shown in Example II.

EXAMPLE II

Eight experiments were run, all with a feed solution 1 N in sodium nitrate and 0.01 N in cesium chloride. Flow rates, pH values and operating temperatures were varied as is shown in Table I. The capacity of the clinoptilolite in this example as in all other instances was the quantity sorbed at the breakthrough point.

Table I

| Flow Rate, gal./ft.²/day | Temp., °C. | pH | Capacity of Clinoptilolite, meq. Cs/100 grams |
|---|---|---|---|
| 5,000 | 60 | 11.5 | 50 |
| 5,000 | 60 | 1.3 | 53.8 |
| 5,000 | 25 | 11.4 | 67.5 |
| 5,000 | 25 | 1.0 | 71.2 |
| 1,733 | 60 | 10.9 | 53.8 |
| 1,733 | 60 | 1.3 | 52.6 |
| 1,733 | 25 | 11.2 | 71.8 |
| 1,733 | 25 | 1.2 | 75.0 |

The above-listed results of the eight experiments show that a change of the flow rate has very little effect on the adsorptive capacity of the clinoptilolite, the slower flow rates giving only slightly better results than the higher flow rates. Table I also illustrates that lower pH values are better for high adsorption than the higher pH values (Examples V and VI fall within the limits of analytical error). However, it was found generally that the process is operative at pH values between 1 and 14, the range between 3 and 12 being preferred. At pH values of above 12 the capacity of the clinoptilolite was found to decrease steadily. For instance, while at a pH value of 11.2 the capacity was 71.8 meq. per 100 grams of clinoptilolite, it was 61.2 at a pH value of 12 under the same conditions and with the same feed solution.

The above experiments also illustrate that operation at room temperature is superior to that at elevated temperature. In other experiments, though, it was found that a temperature change had a lesser effect within the pH range of between 3 and 11.

Example III shows the effect of other cations present in the solution on the cesium adsorption.

EXAMPLE III

Five experiments were carried out, all using a solution 0.01 N in cesium chloride and tracer concentrations of $Cs^{137}$. One of the runs was carried out without any further addition, while others contained an additional salt as shown in Table II. For each run 50 grams of clinoptilolite having a particle size of from 1 to 0.25 mm. was used. The clinoptilolite was in a column through which the feed solution was flowed.

Table II

| Additional Salt | pH | Cesium capacity, meq./100 grams clinoptilolite |
|---|---|---|
| 1 N Al(NO₃)₃ | 2.6 | 112.6 |
| 1 N NaNO₃ | 3.2 | 75.0 |
| 1 N Sr(NO₃)₂ | 3.1 | 75.0 |
| 1 N NH₄Cl | 3.0 | 37.5 |
| None | 7.0 | 166.0 |

All of the additional salts impaired the adsorption of cesium; however, considering the predominant concentration of the additional salt, it is still surprising that as high a quantity of cesium was adsorbed as is obvious from Table II. Aluminum nitrate, which is perhaps the salt most frequently present in the waste solutions for which the invention is intended, has a very slight effect on the cesium adsorption. The ammonium ion which competes strongly with the cesium ion and thus has a pronounced unfavorable effect can be removed from the solution, prior to treatment, for instance, by volatilization.

Example IV illustrates the process as applied to an actual waste solution.

EXAMPLE IV

The $Cs^{137}$ content of the waste solution, the feed, in these experiments was $3.4 \times 10^{-2}$ microcuries ($\mu c.$) per milliliter. Five such experiments were carried out in each case with roughly 50 grams of clinoptilolite of the same particle size as in Example III. The clinoptilolite was charged into a column and the volume which the about 50 grams of clinoptilolite occupied was determined. The conditions and results (cesium contents of the various effluents) are shown in Table III.

Table III

| Experiment | $Cs^{137}$, $\mu c./ml.$ | Column volumes, 63 cc./column volume |
|---|---|---|
| 1 | $5.5 \times 10^{-6}$ | 167.8 |
| 2 | $3.5 \times 10^{-6}$ | 172.6 |
| 3 | $6.2 \times 10^{-6}$ | 177.0 |
| 4 | $6.3 \times 10^{-6}$ | 181.1 |
| 5 | $5.5 \times 10^{-6}$ | 185.7 |

It will be noted that the decontamination factor (concentration in feed:concentration in effluent) in all five runs amounted to about $10^4$.

The clinoptilolite can be used a number of times; however, in each instance it has to be regenerated by first eluting the cesium, as has been mentioned before. After elution the clinoptilolite is advantageously reconverted to either the sodium form or to the hydrogen form by contacting it with a dilute mineral acid or a sodium hydroxide solution. This regeneration step can be carried out in the sorption column.

It will be understood that this invention is not to be limited to the details given herein but that it may be modified within the scope of the appended claims.

What is claimed is:

1. A process of separating cesium values from other cations from an aqueous solution containing said cesium values in microquantities and mineral acid salts of said other cations in macroquantities, comprising contacting said solution with clinoptilolite whereby said cesium values are preferentially absorbed on the clinoptilolite, and separating said clinoptilolite with said cesium values from the solution containing the mineral salts of said other cations.

2. The process of claim 1 wherein the clinoptilolite is in the sodium form.

3. The process of claim 1 wherein the clinoptilolite is in the hydrogen form.

4. The process of claim 1 wherein the aqueous solution has a temperature of about 25° C. and a pH value of between 1 and 14.

5. The process of claim 4 wherein the pH value ranges between 1 and 12.

6. A process of separating cesium values from an aqueous solution containing said cesium values in microquantities, other metal values in macroquantities and having a pH value of between 1 and 12, comprising contacting said solution at about 25° C. with clinoptilolite in the hydrogen form whereby said cesium values are preferentially taken up by said clinoptilolite while said other metal values preferentially remain in solution; separating said clinoptilolite with the cesium values from said solution; contacting said clinoptilolite with an aqueous solution containing a base selected from the group consisting of ammonia, potassium hydroxide and rubidium hydroxide whereby the cesium values are eluted from the clinoptilolite; and contacting said clinoptilolite with an acid whereby the clinoptilolite is reconverted to the hydrogen form and thereby regenerated for reuse.

7. A process of separating cesium values from an aqueous solution containing said cesium values in microquantities, other metal values in macroquantities and having a pH value of between 1 and 12, comprising contacting said solution at about 25° C. with clinoptilolite in the sodium form whereby said cesium values are preferentially taken up by said clinoptilolite while said other metal values preferentially remain in solution; separating said clinoptilolite with the cesium values from said solution; contacting said clinoptilolite with an aqueous ammonium hydroxide solution whereby the cesium values are eluted from the clinoptilolite; and contacting said clinoptilolite with a sodium hydroxide solution whereby the clinoptilolite is reconverted to the sodium form and thereby regenerated for reuse.

References Cited in the file of this patent

Merriam et al.: "Journal of Chemical Physics," vol. 24, No. 5, May 1956, pages 993–995.

Gustafson: "Industrial and Engineering Chem.," vol. 41, No. 3, March 1949, pages 464–466.